Oct. 16, 1934.      W. R. BENJAMIN      1,977,035
PEDAL SCOOTER
Filed April 15, 1932    3 Sheets-Sheet 2
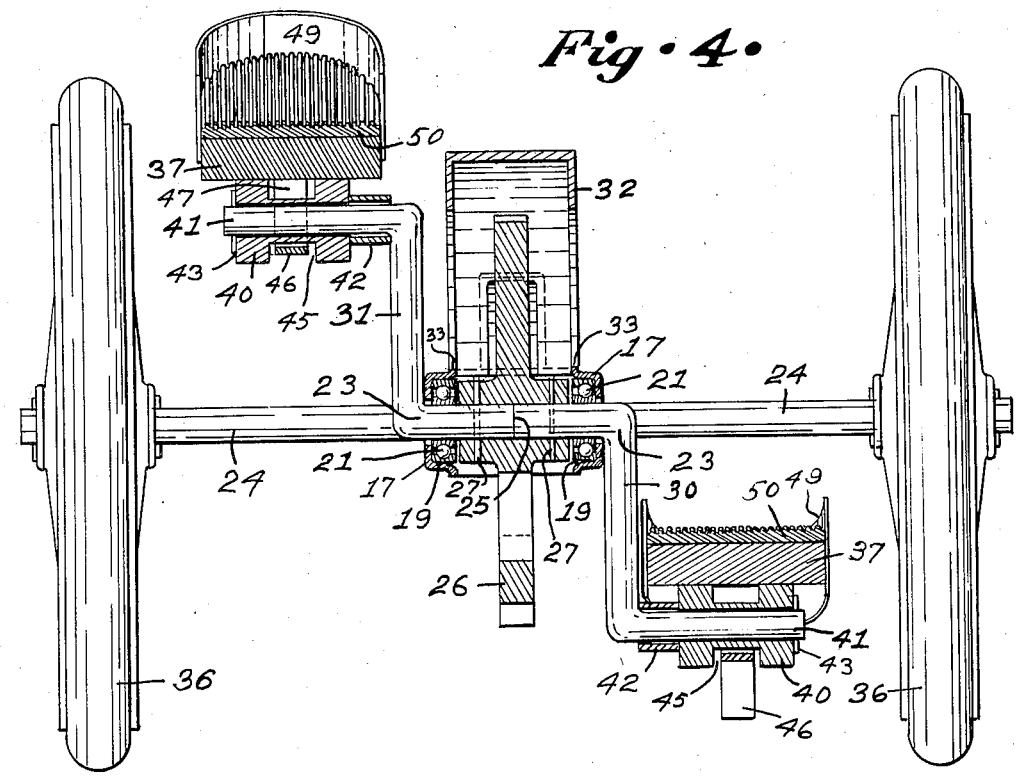
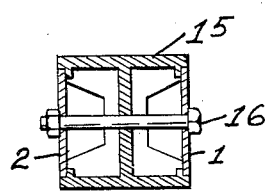
Fig. 6.
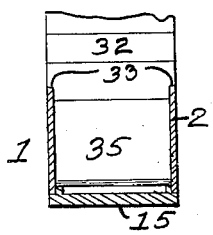
Fig. 7.
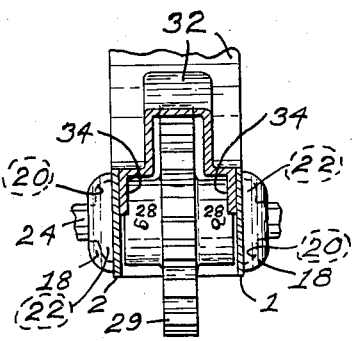
Fig. 5.
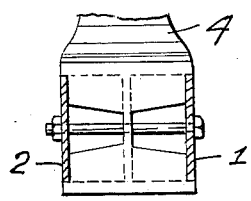
Fig. 8.
INVENTOR:
Walter R. Benjamin,
BY Hugh W. Wagner
ATTORNEY.

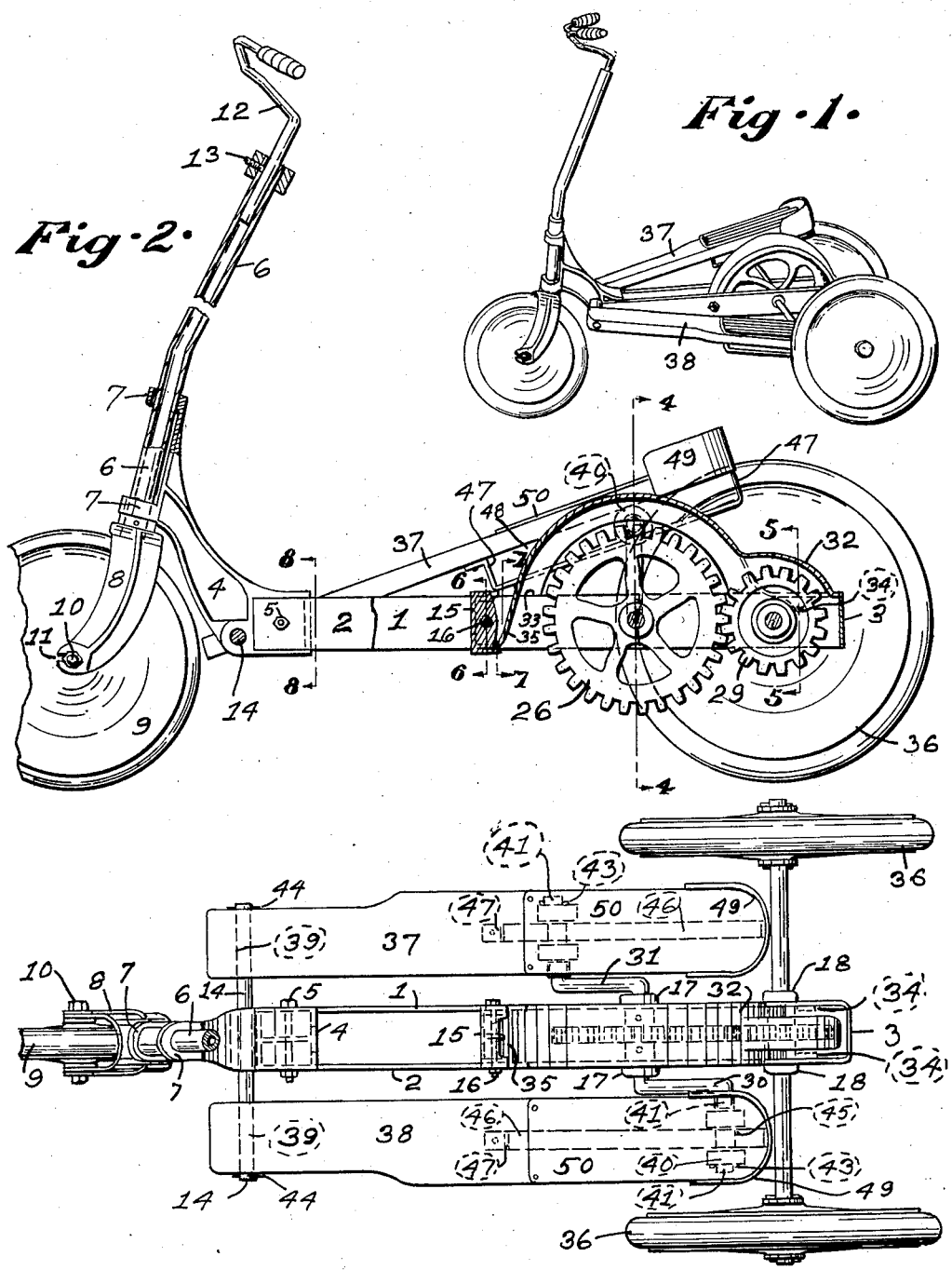

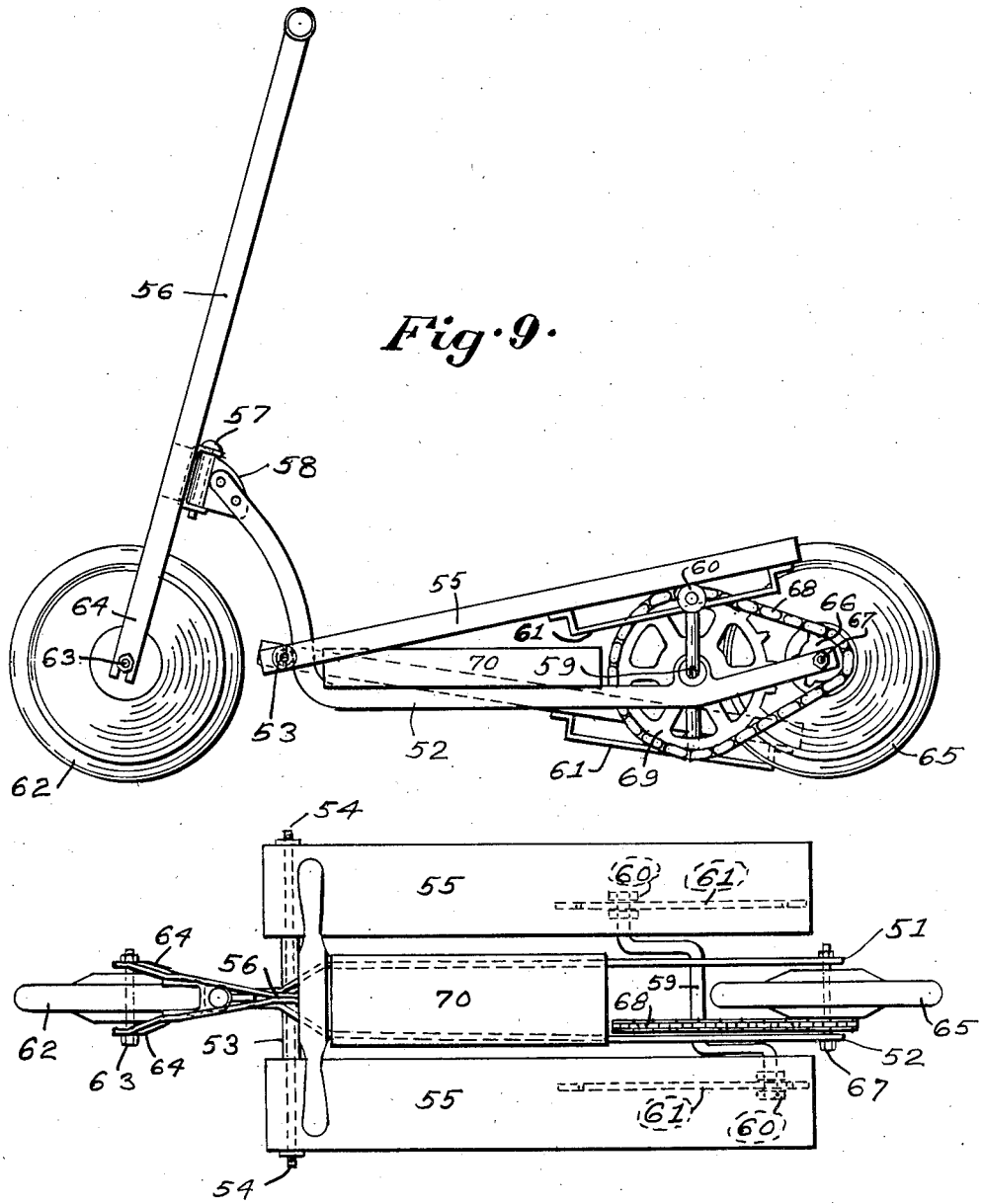

Patented Oct. 16, 1934

1,977,035

UNITED STATES PATENT OFFICE 1,977,035

PEDAL SCOOTER

Walter R. Benjamin, Granite City, Ill.

Application April 15, 1932, Serial No. 605,369

5 Claims. (Cl. 208—34)

This invention relates to vehicles and more particularly to foot-propelled or crank-operated vehicles.

One of the objects of the invention is the provision of a treadle-operated crank-drive characterized by the absence of a dead center.

Another object of the invention is the provision of a treadle-operated vehicle in which the degree of ascent or descent of the operator's foot can be varied to produce a torque of the driving shaft best suited to the weight of the operator and the varying load requirements or resistance of the vehicle.

Another object of the invention is the provision of a novel form of connection of the treadle to the crank in which those components of the crank movement that are parallel to the length of the treadle need not be accompanied by a corresponding swaying of the treadle in the direction of its length.

Another object of the invention is to provide a form of crank-to-treadle connection which will not add unduly to the height of the treadle and yet will not extend above the top of the treadle.

Another object is to provide a crank-to-treadle connection of the aforesaid character that will be simple and rugged in structure, that will function with very little friction, and that can be easily taken apart.

Another object is to provide an assembly of a revoluble shaft and bearings therefor that can be disassembled and removed from the frame of the vehicle without removing portions of the frame.

Another object is to provide a novel form of removable guard for the gearing of the vehicle.

Other objects, advantages, and desirable features of the invention will appear in the course of the following description of divers illustrative embodiments of the spirit of the invention.

In the accompanying drawings forming part of this specification, in which like numbers of reference denote like parts wherever they occur, Figure 1 is a perspective view of one form of vehicle made in accordance with this invention;

Figure 2 is a fragmentary side elevation having parts shown in central section;

Figure 3 is a fragmentary plan view of the same;

Figure 4 is a vertical transverse sectional view taken on the line 4—4 in Figure 2;

Figure 5 is a vertical transverse sectional view taken on the line 5—5 in Figure 2;

Figure 6 is a vertical transverse sectional view taken on the line 6—6 in Figure 2;

Figure 7 is a vertical transverse sectional view taken on the line 7—7 in Figure 2;

Figure 8 is a vertical transverse sectional view taken on the line 8—8 in Figure 2;

Figure 9 is an elevation of another form of the invention; and

Figure 10 is a plan view of the same.

Referring to the embodiment of the invention shown in Figures 1 to 8, inclusive, the frame of the vehicle comprises a flat bar of metal bent in the middle to form two parallel side members 1 and 2, connected at its posterior end by the integral transverse connecting portion 3. The anterior free ends of the side members 1 and 2 are connected to an interposed casting 4 by means of a bolt 5. A steering tube 6 is journaled in bearings 7, formed on the casting 4. A fork 8 is affixed to the lower end of the tube 6, and straddles a wheel 9, journaled on a bolt 10, held in a slot 11 in the lower end of the fork 8. A handle 12 is adjustable in the upper end of the tube 6, and is secured in adjusted position by means of a set screw 13. A transverse shaft 14 is tightly held in the casting 4 and extends a suitable distance out from each side of the casting. A spacer block or casting 15 is interposed between and braces the side members 1 and 2 at their intermediate portion, and is secured thereto by means of a bolt 16, that clamps the said side members tightly against the sides of the block 15.

The side members 1 and 2 bulge outwardly into cup-like formation at 17 and 18 to form sockets or recesses 19 and 20 on the inner sides of the side members 1 and 2. Ball-bearings 21 and 22 are seated in the sockets 19 and 20 and contain the crank-shaft 23 and the shaft or driving axle 24, respectively. The crank-shaft 23 is divided intermediate the bearings 21, as indicated at 25, and a gear 26 is affixed by means of pins 27 to both halves of the divided crank-shaft intermediate the bearings 21. It will be observed that the crank-shaft 23, bearings 21, and gear 26 can be easily removed by removing the pins 27 from the gear 26 and shaft 23. The axle 24 has affixed thereto, by means of pins 28 intermediate the bearings 22, a pinion 29, which meshes with the gear 26 to rotate the axle 24 in a direction opposite to the direction of rotation of, and at a higher speed than, the crank-shaft 23. The pinion 29 obstructs egress of the ball-bearings 22 from their sockets 20, and the gear 26 likewise obstructs the egress of the bearings 21 from their sockets 19. The crank arms 30 and 31 of the crank-shaft 23 prevent endwise dislocation of the crank-shaft, and so does the gear 26. A guard 32 rests on the side members 1 and 2 at 33, and covers the gears 26 and 29. Flanges 34 depend from the guard 32 to abut against the inner sides of the side members 1 and 2 in juxtaposition to the pinion 29 to prevent lateral dislocation of the guard at that point. A tongue 35 depends from the anterior end of the guard 32 and fits tightly between the side members 1 and 2 to prevent lateral shifting of the anterior end of the guard and also to hold the guard frictionally against rising accidentally from the side members 1 and 2. The friction at the tongue can be adjusted by turning the nut of the bolt 16. The axle 24 carries wheels 36 on opposite ends of the axle, one of these wheels 36 preferably being loose and the other tight, as usual.

The anterior ends of treadles 37 and 38 at respective opposite sides of the frame are provided with bearings 39 that pivotally receive the respective projecting ends of the stationary shaft 14. The posterior ends of the treadles 37 rest on anti-friction rollers 40, journaled on crank pins 41 formed integral with the arms 30 and 31. The rollers 40 are spaced from the arms 30 and 31 by means of sleeves 42 on the pins 41. Cotter pins 43 prevent undue outward movement of the rollers on the pins 41. Cotter pins 44 likewise limit outward movement of the anterior ends of the treadles 37 on the shaft 14. Each of the rollers 40 is provided with a groove 45 in the middle of its face to receive a rod 46 affixed to the underside of the treadle 37 associated therewith, the rod being parallel to and spaced from the treadle 37 by means of its L-shaped ends 47 to form an intervening slot 48 for receiving the roller 40. The posterior end of each treadle 37 may be provided with a heel guard 49 and a rubber mat 50, preferably corrugated.

The crank arms 30 and 31 are one-hundred and eighty degrees apart in phase; and, if both treadles 30 and 31 remained parallel to one another at all phases of the crankshaft, each treadle would be at dead center at its highest point while its companion treadle would be at dead center at its lowest point, that is, the dead centers occur when each crank arm is at right angles to the length of its associated treadle. However, by pivoting each treadle at one point so that it changes its angular relation to the crankshaft as the crankshaft revolves, and by selecting the pivotal points of the treadles so that the treadles are not parallel to each other when they are at dead center, as, for instance, by pivoting both treadles to a common shaft 14 as exhibited in Figure 2, the two treadles can never be simultaneously at dead center. If the treadle pivot 14 is located anteriorly of the crankshaft, as in Figure 2, the weight of the operator on the treadle 37 will rotate the crank shaft 23 and gear 26 clockwise, the latter in turn rotating the pinion 29 and the axle 24 counter-clockwise so as to drive the vehicle forward. In starting the vehicle or in ascending a hill, the operator places his feet on the rear end of the pedals 37 and 38 directly over the crankshaft 23 so that the full weight of his body will be available to produce the large torque that needs to be supplied to the crankshaft. However, at the rear end of the pedals the length of stroke of the operator's feet is a maximum, and, to avoid an unnecessary degree of foot movement while riding over a level stretch of ground, the feet of the operator may be placed farther forward on the treadles, because the smaller torque so supplied thereby will be ample for this purpose. It will be observed that the slotted form of crank-to-treadle connection embodied herein allows the crank-pin 41 to be in close proximity to the treadle, so as not to add unduly to the height of the treadle above the crankshaft, while at the same time this connection is located wholly beneath the treadle so as not to interfere with the free movement of the driver's feet. Furthermore, there is no swaying of the pedals back and forth. It will be further apparent that the treadles and crankshaft and axle and the bearings therefor can be easily assembled or disassembled without removing portions of the frame of the vehicle. The guard 32 is easily removable and can, also, be used as a rest for the feet while either one or both treadles are idling.

The form of the invention shown in Figures 9 and 10 comprises a frame having side members 51 and 52 to which is welded the stationary tube 53, carrying the shaft 54, to which are pivoted the treadles 55. The steering post 56 is pivoted by means of a king bolt 57 to the bracket 58, rigidly attached to the anterior ends of the side members 51 and 52. The crank-shaft 59 is journaled in the side members 51 and 52 and carries grooved rollers 60 that engage the rods 61 and the undersides of the treadles 54. The front wheel 62 is journaled on a bolt 63 that passes through the forked lower end 64 of the steering bar 56. A single rear wheel 65, attached to a sprocket wheel 66, is journaled on a bolt 67 that connects the rear ends of the side members 51 and 52. A sprocket chain 68 passes over the sprocket wheel 66 and a sprocket wheel 69, affixed to the crank-shaft 59. A foot rest 70 may be secured to the upper edges of the side members 51 and 52.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a foot-propelled vehicle, wheel means, crank means for rotating the said wheel means, treadle means for operating the said crank means, roller means borne by the said crank means, and a rod borne by the treadle means beneath and in spaced relation to the bottom of the latter to define an intervening slot, the said roller means traversing the said slot and having a groove engaging the said rod, the said rod being narrower than and intermediate of the width of the treadle means, and the roller means engaging the underside of the treadle means at each side of said rod.

2. In a foot-propelled vehicle, a frame comprising a pair of side members, a treadle located along the outer side of each side member, gearing intermediate the said members and operated by the treadles, and a removable guard covering the said gearing, the said guard being frictionally interposed between the said side members and forming a stationary tread intermediate said treadles.

3. In a foot-propelled vehicle, a frame including a pair of side members, a treadle located along the outer side of each side member, gearing intermediate the said members and operated by the treadles, and a removable guard covering the said gearing and resting on the said side members, the said guard forming a stationary tread and having a tongue frictionally interposed between the said side members.

4. In a foot-propelled vehicle, wheel means, crank means for rotating the said wheel means, treadle means for operating the said crank means, rod means detachably secured to the underside of the treadle means and co-operating therewith to form a slot intermediate said rod means and treadle means, and anti-friction roller means borne by the crank means for traversing said slot.

5. In a foot-propelled vehicle, a frame comprising a pair of side beams, struts interposed at intervals between said side beams and recessed on opposite sides to receive the same, screw means for drawing said beams against said struts, gearing located between the side beams and successive struts, and a guard covering the gearing, said guard overlying the side beams to rest thereon and having a depending tongue juxtaposed to one of the struts and adapted to be frictionally held between said beams when said screw means is properly adjusted.

WALTER R. BENJAMIN.